C. BARRY.

Making Tin Cans.

No. 3,143. Reissued Oct. 6, 1868.

Witnesses

Louis Bowler

Jacob F. Mowry

Inventor

Christian Barry by Dodenhausen & Co attys

UNITED STATES PATENT OFFICE.

CHRISTIAN BARRY, OF PHILADELPHIA, PENNSYLVANIA.

IMPROVEMENT IN MACHINES FOR MAKING TIN CANS.

Specification forming part of Letters Patent No. 71,680, dated December 3, 1867; Reissue No. 3,143, dated October 6, 1868.

*To all whom it may concern.*

Be it known that I, CHRISTIAN BARRY, of the city and county of Philadelphia, and State of Pennsylvania, have invented a new and useful Mode of Manufacturing Cans; and I do hereby declare the following to be a full, clear, and exact description of the same, sufficient to enable others skilled in the art to which my invention appertains to fully understand and use the same, reference being had to the accompanying drawings, making part of this specification, in which—

Figure 1:
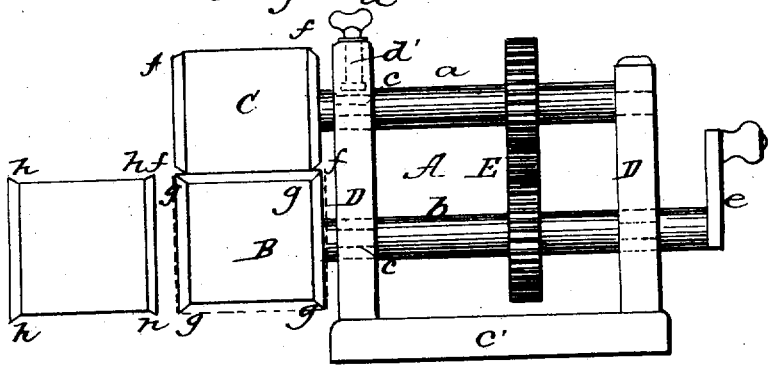
Figure 2:
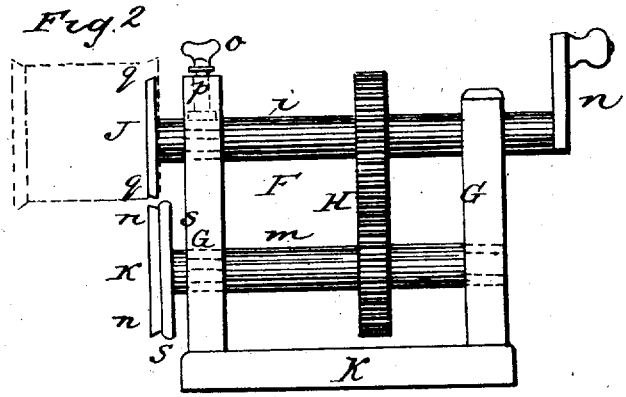
Figure 3:
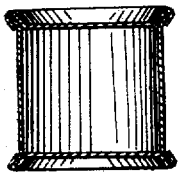
Figure 4:
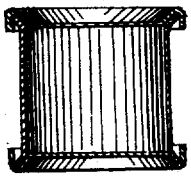
Figure 5:
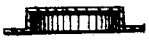
Figure 6:
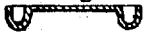

Figures 1 and 2 are side elevations of devices employed in making cans according to my invention. Fig. 3 is a central vertical section of the can as completed. Figs. 4, 5, and 6 are diagrams illustrating the mode of forming and joining together the parts of the can.

My invention has for its object novel means for manufacturing cans from tin and other metals, and according to the patent or design for which Letters Patent have been granted me of date November 5, 1867; and it consists in a burring or rounding tool for giving the body of the can its shape, and in swages or dies for closing the seam between the top and bottom or covers and the body of said can, as will be hereinafter more fully described.

In carrying out my invention, I form the top and bottom of the can by "striking up" a disk of metal, so as to make it assume the shape of a low-crowned hat of perfectly cylindrical form, having a circular rim at right angles to the crown, as shown in Fig. 5. This being applied to a "stripping-tool," the rim is turned or bent, so as to form a circular groove around the crown or struck-up portion, as seen in Fig. 6, which groove is to receive the edge of the top or bottom of the body of the can. The body of the can is formed of a strip or piece of metal having its edges joined so as to form an unbroken cylinder, having the joint at the side and its top and bottom free and open.

Having thus far constructed the can, it is ready to be applied to the devices shown in the drawings.

A represents the burring or rounding tool, consisting of two rolls, B and C, arranged side by side, and mounted on shafts *a* and *b*, having their bearings in suitable boxes, *c*, on an upright framing, D, arising from a base, *c'*. The boxes of shaft *a* slide between the uprights, and are adjustable by means of a set-screw, *d*, on the cross-piece *d'*, whereby the two rolls are moved toward or away from each other. The shaft *b* has a crank or handle, *e*, at the end opposite to the rolls, by which the shaft *b* is turned, motion being communicated to shaft *a* through the medium of the gearing E, which causes the rolls to rotate in opposite directions. The rolls are secured to the shafts on the outside of the frame D. The roll C is of the form of a cylinder, having its edges beveled or chamfered, as at *f*. The roll B has continuous flanges *g* at both ends, which project outwardly in opposite directions at an angle of forty-five degrees, more or less. The body of both rolls between the bevel and flanged edges is unbroken, being perfectly cylindrical. The bevel edges of roll C rotate within the flanged edges of roll B. The cylinder or body of the can, as previously described, is now slipped over the roll B, the roll C is advanced thereto, and motion communicated to both rolls. The roll C will firmly press the body of the can against the roll B, so that the said body will assume the form of the latter—that is, the portion of the body at and near its edges is bent or pressed, so as to project outwardly, as shown at *h*, Fig. 1. These projecting edges enter the groove in top or bottom, Fig. 6. The lids and body should then be put together, as shown in Fig. 4; and the can, as partly completed, is now ready for the closing-tool.

F represents the closing-tool. (See Fig. 2.) *k* is a base or foundation from which arise standards united by cross-pieces, forming an upright framing, G. On the cross-pieces there are mounted in suitable boxes two shafts, *l m*, each carrying a tooth-wheel, H, meshing into each other. The upper shaft, *l*, is provided with a crank-handle, *n*, by which power is communicated to the shafts. The shafts rotate in opposite directions and are extended beyond the frame G, and carry the closing swages or dies J K, consisting of two disks, whose peripheries may be made to approach or recede from each other by means of a set-screw, *o*, on the cross-piece *p*, which screw raises and lowers the boxes or bearings of the shaft *l* at the end opposite to the crank-handle *n*, the said boxes sliding between the uprights of frame D. The swage or die J has its periphery beveled outwardly, as shown at *q*. The periphery of the swage or die K is beveled inwardly, as shown at *r*, to about its middle, where the bevel may terminate in a shoulder, *s*, which serves as a gage or bearing-guide for the extremity of the can. As the bevel of the swage J is outward and that of the swage K inward, it is evident that if the two swages were brought together they would lie snugly upon each other at the point of contact, and occupy this position during rotation, and the inner edge of the swage J will bear against the shoulder *s* of swage K.

In order to close the same between the lids or top and bottom and the body of the can, I apply the lid, as shown in Fig. 4, and introduce one end of the can between the peripheries of the swages or dies J K. The countersunk head or lid lies against the outer face of the swage J. The position of the lid and body will be fully understood by reference to Fig. 4. The swages being rotated, they will cause the can to rotate, and thus bring every part of the seam to the action of both swages. It is desirable that the can should be held up against the swage J, so as to guide it and make the seam uniform throughout. It will be noticed that the two swages rotating and being almost in contact will clinch or clamp the parts comprising the joint or seam, so as to lie firmly and closely against each other without any space between them. The said seam or joint will be found to be so uniformly and perfectly tight that there is no opportunity for ingress or egress of air, water, or any other fluid.

A can constructed according to the above will be found useful for many purposes, especially for alkalies which are put up or packed in a heated state. I dispense entirely with solder in closing the seam or joint between the top or bottom and the body of the can, and therefore claim a great superiority over the old modes of making cans. Should it be desired to have only the top or bottom flat, and without the outwardly-projecting seam, one of the flanges of rolls B must be dispensed with. The top or bottom will then be soldered as usual, but the other top or bottom will undergo the operation hereinbefore described.

From practical operation my mode is found to produce a can useful, simple, and cheap.

I do not limit myself to the particular arrangement of the several parts of the instruments as herein shown, as the same may be modified variously without essentially varying the means employed to attain the desired end. The shoulder *s* is not indispensable, as the instrument F may be operated successfully without said shoulder. I prefer to use it, however, as it forms an effective gage or guide, as well as a support for the edge of the can at the extremity during the clamping or lid-closing operation.

Having thus described my invention, what I claim as new, and desire to secure by Letters Patent, is—

1. The mode of manufacturing cans, substantially as herein described.

2. The roll C, with beveled edge *f*, and roll B, with flange edge *g*, operating together, substantially as herein described, for the purpose specified.

3. The swage or die J, having bevel periphery *q*, and swage or die K, having a correspondingly-beveled periphery, *r*, operating together, substantially as described, for the purpose specified.

4. The shoulder *s* on the swage or disk K, forming a gage and support, substantially as herein described and represented.

To the above I have signed my name this 3d day of August, 1868.

CHRISTIAN BARRY.

Witnesses:

CHAS. D. SMITH,

JOHN A. WIEDERSHEIM.